Jan. 6, 1970            W. H. JONES            3,487,575

WORM GUN

Filed Sept. 26, 1968

INVENTOR

William H. Jones

BY

ATTORNEYS

United States Patent Office 3,487,575
Patented Jan. 6, 1970

3,487,575
WORM GUN
William H. Jones, 8721 Elm, Kansas City, Mo. 64138
Filed Sept. 26, 1968, Ser. No. 762,864
Int. Cl. A01k 97/00
U.S. Cl. 43—4          8 Claims

ABSTRACT OF THE DISCLOSURE

A device for assisting in the baiting of fish hooks with fishing worms has an elongated barrel or trough-like structure which has an open top side and openings in the two ends thereof. A cover member is pivotally mounted to one end portion of the trough structure and is movable between a position which closes the open side of the barrel and a second or worm loading open position. A plunger extends through one of the open ends of the barrel and may be withdrawn from the trough for purposes of loading the worm therein. Once the worm has been placed interiorly of the barrel and the cover closed, the plunger may be depressed, forcing the worm out the opposite open end into a convenient hook baiting position.

BACKGROUND AND BRIEF DESCRIPTION OF THE INVENTION

The baiting of hooks with fishing worms has long been an undesirable task for some people. The usual operation requires that a fishing worm be manually picked up by the fingers and threaded onto the hook. As was often the case, the worm tended to secrete an undesirable and sometimes noxious fluid onto the hands and fingers of the fisherman, while at the same time wiggling and offering considerable resistance to being placed onto the hook.

Additionally, older people with unsteady hands many times experience hook baiting problems and may need or require help in doing so. My invention relates to a device which will both eliminate the distastefulness of fish hook baiting, while at the same time, it operates to provide a significant aid to those no longer dextrous enough to perform the hook baiting process.

My device may be manufactured of a flexible plastic and includes a trough shaped barrel with an open upper side and with open opposite ends thereof. A cover is pivotally attached at one end thereof to the trough and may be movably shifted between a position which either closes or opens the barrel. A plunger means extends through one of the open ends interiorly of the barrel and may be slidably moved therewithin. With the pivoted or hinged cover in the open position, and the plunger sufficiently withdrawn, a fishing worm may be laid along the length of the barrel. The cover may then be closed and the plunger means moved inwardly of the barrel thereby forcing the worm out the open end and into a convenient hook baiting position.

An object of my invention is to provide a uniquely constructed device for assisting in the baiting of fish hooks with fishing worms.

Another objct of my device is to provide a fish hook baiter of the character described which not only eliminates the handling of the fishing worm during the baiting process, but also stabilizes and controllably immobilizes the worm as it is threaded onto the hook.

A further object of my invention is to provide a fish hook baiter of the character described which may be conveniently manufactured from an attractive rugged or flexible plastic material such as polyethylene and which has a pivotally connected cover that is movable between an open, or worm receiving position, and a closed, or worm ejecting position. It is an important feature of this invention that the device is constructed so that it may be easily held in one hand and manipulated thereby so that the remaining hand is free for proper positioning of the hook during the baiting process.

A still further object of the invention is to provide a fish hook baiter which it constructed of a lightweight rugged and plastic material and which has a longitudinal trough-like barrel and a cooperating cover of a suitable size and shape so that when it is in the closed position the cooperating barrel and cover form an enclosed passageway for the forcible extrusion of the fishing worm into a convenient hook baiting position. It is a feature of the invention that the cover is wedge shaped in cross section and cooperates with a similarly shaped upper opening to facilitate receiving and holding the cover when moved to the closed position or to vary the diameter of the passageway.

A further object of the invention is to provide a fish hook baiter which has a finger plate integrally formed with one end portion of the barrel so that the entire structure may be held by one hand as one would hold a syringe, thereby allowing the thumb to activate a plunger and in this manner force a fishing worm (or similar bait) located interiorly of the barrel out and open end thereof into a hook baiting position.

Other and further objects of the invention, together with the features of novelty appurtenant thereto will appear in the course of the following description.

DETAILED DESCRIPTION OF THE INVENTION

In the accompanying drawings which form a part of the specification and are to be read in conjunction therewith, and in which like reference numerals indicate like parts in the various views.

Figure 5:
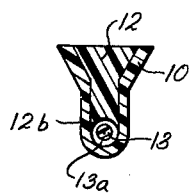
FIG. 5 is a sectional view taken generally along the line 5—5 of FIG. 2 in the direction of the arrows, and showing the barrel, cover and plunger therein.

Turning now more particularly to the drawing, reference numeral 10 represents the trough-like barrel mentioned above. As best seen in FIG. 5, the upper portion of trough 10 would approximate the upper portion of an open V. The lower portion of the trough depends generally vertically, but at a slight inward taper, from the upper V-ed opening and has a rounded bottom forming substantially an intergally interconnected structure in the shape of a U.

Figure 1:
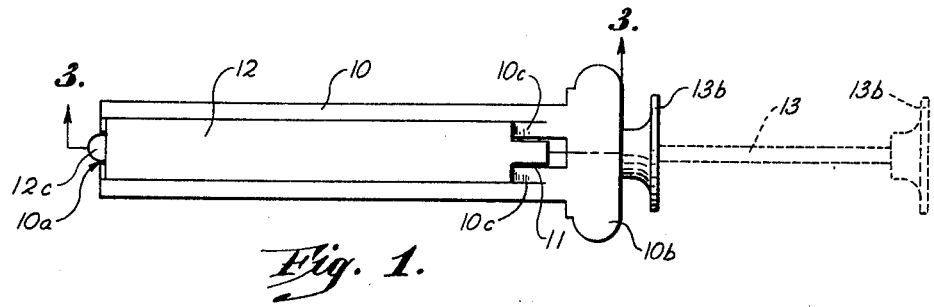
FIG. 1 is a top plan view of my fish hook baiter, with the broken line used to show the plunger in the withdrawn position.
Figure 2:
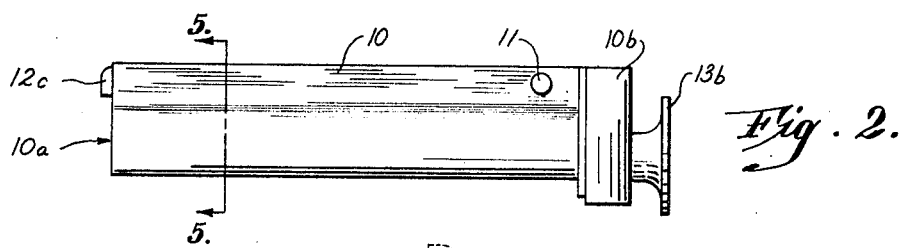
FIG. 2 is a side elevational view of the device shown in FIG. 1.
Figure 4:
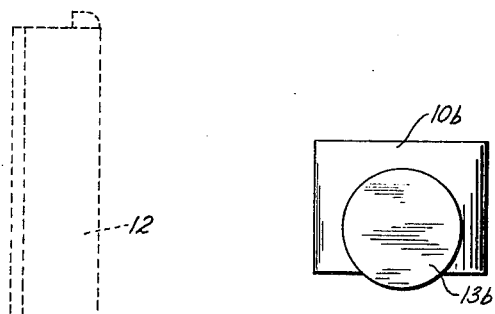
FIG. 4 is a right hand end elevational view of the device shown in FIG. 2 showing the plunger end thereof.
Figure 3:
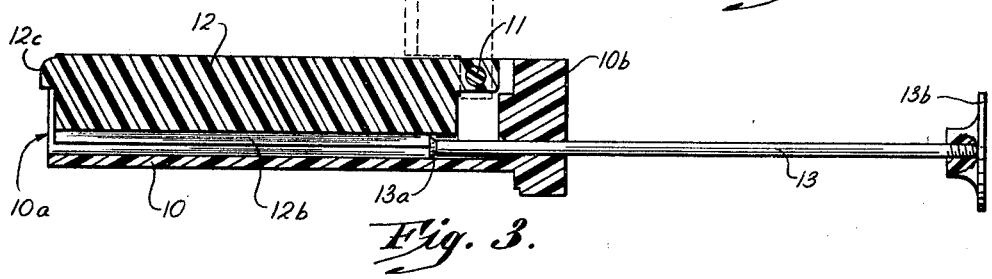
FIG. 3 is a sectional view taken generally along the line 3—3 of FIG. 1 in the direction of the arrows, with the plunger shown in a withdrawn or position to eject a worm from the device.

Barrel 10 is an elongate structure having a section shape as mentioned above, with a discharge end 10a shown on the left hand side of FIGS. 1, 2 and 3. The right hand portion of the barrel has a finger plate 10b formed at a right angle to the longitudinal center line of same. As clearly seen in FIG. 1, finger plate 10b has rounded vertically oriented end extremities which extend a sufficient distance past the barrel sides to enable finger contact to be made therewith on the left hand (as seen in the views) or barrel side of the finger plate.

Adjacent to the finger plate and on the left hand side thereof are embossed reinforced opposed sides 10c which extend vertically up from the U-shaped lower portion of the barrel to the upper open surface thereof. These sides contain aligned apertures which receive pivot pin 11 to facilitate the pivotal or hinged interconnection of cover 12 with barrel 10. Cover 12 is pivotally connected to barrel 10 by extending pivot pin 11 through aligned openings in sides 10c and cover tongue 12a. As a result, cover 12 may be pivotally moved between a barrel closing position shown in FIG. 1 and a fully open position shown by the broken lines in FIG. 3.

The cover member is shaped, when viewed in section, so that it may matingly fit interiorly of the open barrel (see FIG. 5). In this regard, the upper portion of the cover is wedge shaped to correspond with the open V-shaped upper portion of barrel 10. The lower portion of the cover exteneds vertically downwardly with the under surface of the cover containing a semi-circular groove 12b to accommodate the upper portion plunger mechanism to be described later. The forward or discharge end of the cover has a lifting knob 12c formed integrally therewith and extending beyond the end extremity of the barrel to facilitate the lifting of the cover from the solid line to the broken line position (see in FIG. 3).

The plunger mechanism mentioned above has a shaft 13 which extends through an aperture or opening in finger plate 10b so that it may ride interiorly of the opening in barrel 10. The left hand end portion of the shaft has a flared or larger diameter worm contacting surface 13a which further precludes its complete withdrawal from barrel 10 through the finger plate end thereof. The right hand end portion of shaft 13 is externally threaded to facilitate the engagement of a thumb pad 13b. The length of the plunger 13 is selected so that when the inner face of thumb pad 13b contacts the outer face of finger plate 10b the worm contacting surface of shaft 13 extends nearly to the left hand or discharge end of trough 10 having a small gap therebetween. As further shown in FIG. 3, the groove in the lower portion of cover 12 cooperates with the lower portion of the U-shaped interior of the barrel to form an enclosed cylindrical passageway extending substantially the length of the barrel.

In operation, the cover 12 may be raised simply by engaging the underside of lift knob 12c and pivotally moving the cover 12 to the position shown in FIG. 3 (or any suitable open position). The plunger thumb pad 13b is then withdrawn, thereby withdrawing shaft 13 and the worm contacting surface 13a from barrel 10. A fishing worm may then be placed within the barrel (the open V-shape of same particularly aiding in properly locating the worm), and cover 12 pivoted downwardly about pin 11 until it occupies the position similar to that shown in FIG. 3. This locates the fishing worm between the cover and the U-shaped portion of the trough. Applying a slight manual pressure near the discharge end of the cover enables the user to selectively regulate the diameter of the bore (near the discharge opening) depending upon the size of the fishing worm.

With the fishing worm now loaded therein, the device may be grasped in either hand with the forefinger and middle finger on either side of the finger plate adjacent the barrel and the thumb of the same hand on the outside of thumb pad 13b. Depressing the plunger mechanism (by exerting an inward force with the thumb) forces the worm out the discharge end of the device in a controlled maner. The fishing hook may be held adjacent the discharge opening with the worm being gradually worked thereon. In this manner, normal worm excretions are not allowed to come in contact with the hand of the user and greater control may be exercised over what could possibly be a wiggling and hard to handle bait.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A device for assisting in the baiting of fish hooks comprising
   a barrel, said barrel having one side open with additional openings at each end thereof,
   an articulating cover, said cover being movable to a position which closes said open side of said barrel,
   a slidable plunger extending through one of said open ends, said barrel operable to receive said bait with said cover open and said plunger operable to force said bait out of said other open end and into a convenient hook baiting position with said cover closed.

2. The invention as in claim 1 wherein said barrel and said cover have mating symmetrical shapes, said barrel having flexible sides, said cover being engageable within said sides thereby cooperating with said cover to form a cylindrical passageway for locating said bait.

3. The invention as in claim 1 wherein said cover is pivotally connected to said barrel at one end thereof, said barrel and said closed cover cooperating to form a passageway for locating said bait therein, said plunger slidably movable against said bait in said passageway to force the bait out into said hook baiting position.

4. The invention as in claim 3 wherein said cover is provided with a lifting knob on an end opposite said pivotally connected end.

5. The invention as in claim 3 wherein the sides of said barrel are flexible, and wherein said cover wedgably engages portions of said sides in the closed position.

6. The invention as in claim 3 wherein said plunger is slidably mounted within said barrel, said plunger having an enlarged bait contacting portion interiorly of said barrel and an operating surface for applying manual pressure located exteriorly thereof.

7. The invention as in claim 6 wherein the sides of said barrel are flexible, and wherein said cover wedgably engages portions of said sides in the closed position.

8. The invention as in claim 7 wherein said cover is provided with a lifting knob on an end opposite said pivotally connected end.

References Cited

UNITED STATES PATENTS

| | | | |
|---|---|---|---|
| 2,846,803 | 8/1958 | Rettig | 43—4 |
| 2,885,814 | 5/1959 | Schlador | 43—4 |
| 3,164,067 | 1/1965 | Hurst | 43—4 |

WARNER H. CAMP, Primary Examiner